Zeigler & Grover,
Stump Elevator.
No 14,937. Patented May 20, 1856.
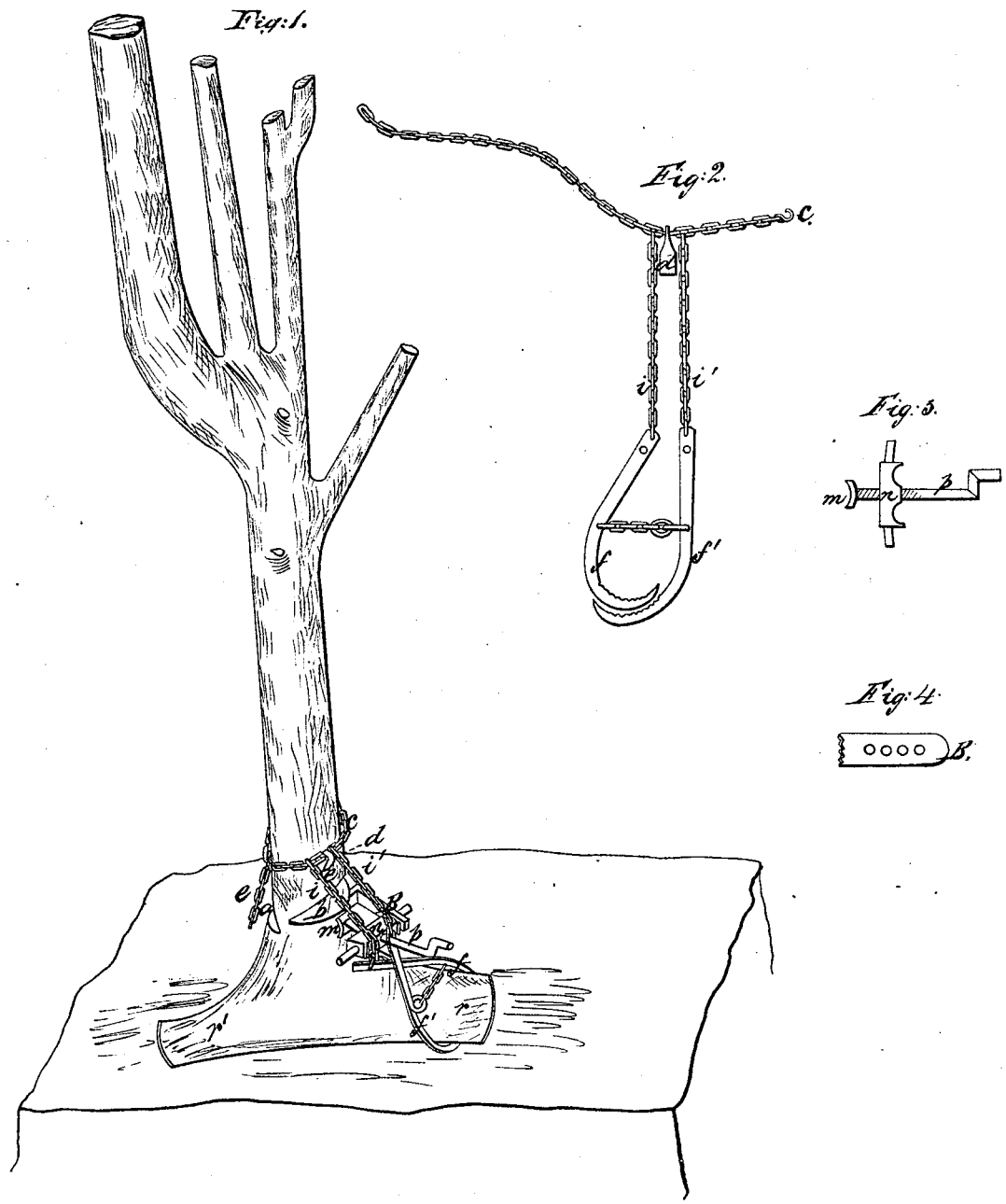

UNITED STATES PATENT OFFICE.

GEO. W. ZEIGLER, OF TIFFIN, AND MANASSEH GROVER, OF CLYDE, OHIO.

MODE OF EXTRACTING STUMPS.

Specification of Letters Patent No. 14,937, dated May 20, 1856.

*To all whom it may concern:*

Be it known that we, GEORGE W. ZEIGLER, of Tiffin, in the county of Seneca and State of Ohio, and M. GROVER, of Clyde, in the county of Sandusky and State of Ohio, have invented a new and useful Improvement in Machinery for Extracting Tree-Stumps; and we do hereby declare that the following is a full, clear, and exact description of the construction and operation of the same, reference being had to the annexed drawing, forming part of this specification, in which—

Figure 1 represents a tree with our apparatus in position for operation. Fig. 2 shows the hooks and chains of the apparatus detached from the tree. Fig. 3 is a view of adjuster. Fig. 4 shows chain brace.

Similar characters of reference in the several figures denote the same part of the apparatus.

The nature of our invention consists in rendering the weight of the tree at the time of felling, effectual in extracting the stump from the earth, by a system of chains and hooks hereinafter to be described.

The tree is cut in the usual manner by notches $a$ and $b$; the notch $a$ on the side toward which the tree is to fall, being slightly below notch $b$, to prevent the slipping of the butt of the tree. The roots $r\ r'$ are then cut as shown in Fig. 1.

A chain, $c$, shown in Fig. 2, is then securely fastened around the body of the tree above the cut, the tongue $d$ being made to rest in a notch $e$ cut in the tree, to prevent the slipping down of this chain. The hooks $f\ f'$ are made to embrace root $r$ at as great a distance as the chains $i\ i'$ will allow. The adjuster is then placed in position with chains $i\ i'$ in grooves of adjuster. The plate $m$ rests against the stump, and cross bar $n$ is moved to a greater or less distance from the stump by screw $p$, regulating the slack of chains $i\ i'$. When the tree begins to fall the chains $i\ i'$ tighten, and the weight of the tree tends to lift the roots on the right (as in the drawing) and thus turn the stump about the cut ends of the roots on the left, completely extracting the stump as the tree falls.

The brace B shown in position in Fig. 1, serves to prevent the chains $i\ i'$ from being drawn aside by the swerving of the tree in its fall. The several holes in the brace adjust it to the different distances of bar $n$ from the tree.

The several parts of this apparatus may be varied in many respects without changing the principle of action. This right of change we therefore claim.

The advantages of this means of extracting stumps need not be here particularized, as they are obvious to all acquainted with this subject.

Without claiming the separate parts of our apparatus, we claim as new and desire to secure by Letters Patent—

Utilizing the weight of the tree, while falling, for extracting its stump, by the combination of chains and hooks and adjuster, substantially as herein set forth.

In testimony whereof, we have hereunto signed our names before two subscribing witnesses.

GEORGE W. ZEIGLER.
MANASSEH GROVER.

Witnesses:
GEO. PATTEN,
JOHN S. HOLLINGSHEAD.